United States Patent
Kruys et al.

(10) Patent No.: US 7,548,750 B2
(45) Date of Patent: Jun. 16, 2009

(54) SYSTEM AND METHOD FOR DETECTION OF PRIMARY SPECTRUM USERS

(75) Inventors: Johannes P. Kruys, Harmelen (NL); Christopher G. Meil, Akron, OH (US)

(73) Assignee: Cisco Technology, Inc.

( * ) Notice: Subject to any disclaimer, the term of this patent is extended or adjusted under 35 U.S.C. 154(b) by 576 days.

(21) Appl. No.: 11/225,719

(22) Filed: Sep. 13, 2005

(65) Prior Publication Data

US 2007/0060065 A1    Mar. 15, 2007

(51) Int. Cl.
*H04W 24/00* (2006.01)
(52) U.S. Cl. .................. 455/423; 342/159; 342/57; 342/192; 342/195
(58) Field of Classification Search ............. 342/159, 342/57, 192, 195; 455/423
See application file for complete search history.

(56) References Cited

U.S. PATENT DOCUMENTS

| | | | |
|---|---|---|---|
| 7,107,032 B2* | 9/2006 | Li | 455/296 |
| 2003/0107512 A1* | 6/2003 | McFarland et al. | 342/159 |
| 2003/0206130 A1* | 11/2003 | Husted et al. | 342/57 |
| 2004/0132411 A1 | 7/2004 | Li | |
| 2004/0151137 A1* | 8/2004 | McFarland et al. | 370/329 |
| 2004/0156336 A1* | 8/2004 | McFarland et al. | 370/329 |
| 2004/0157580 A1* | 8/2004 | Stadelmeier et al. | 455/338 |
| 2005/0059363 A1* | 3/2005 | Hansen | 455/127.4 |
| 2005/0059364 A1* | 3/2005 | Hansen et al. | 455/127.4 |

FOREIGN PATENT DOCUMENTS

WO    WO 02/082844 A2    10/2002

* cited by examiner

*Primary Examiner*—Matthew D Anderson
*Assistant Examiner*—April S Guzman
(74) *Attorney, Agent, or Firm*—Tucker Ellis & West LLP

(57) ABSTRACT

An external primary spectrum user detector (ESUD) is used to take over the role of integral radar detectors, and relieve user devices of the constraints associated with Primary Spectrum User detection. The ESUD can establish a relationship with the user devices by means of a cryptographic signature. The ESUD installation includes assigning it a frequency band to scan for primary spectrum user signals and the type of signals to be detected. Once activated, the ESUD will scan its assigned frequencies and emit to types of messages, "All Clear" and "Primary Spectrum User detected." User devices on the network listen for the ESUD messages. In the absence of messages from the ESUD, the user devices activate their internal primary spectrum user detectors until ESUD messages are received.

10 Claims, 9 Drawing Sheets

SYSTEM AND METHOD FOR DETECTION OF PRIMARY SPECTRUM USERS

BACKGROUND OF THE INVENTION

The present invention relates generally to spectrum sharing by wireless devices. An aspect of the present invention relates to a reliable system and method for detection of radar signals enabling a wireless network to share radar frequencies.

Spectrum sharing by wireless devices, such as wireless network devices, sometimes requires the detection and avoidance of primary users of a particular portion of the spectrum, such as radar systems. However, the detection function may not be possible or in conflict in some ways with the primary purpose of a wireless device. Furthermore, regulatory requirements typically demand that the primary user detection function operates under any condition. Thus, the need exists for a reliable radar detection technique that does not conflict with the primary purpose of a wireless device.

BRIEF SUMMARY OF THE INVENTION

In accordance with an aspect of the present invention, there is disclosed herein a primary spectrum detection function, for example a radar detection function, that is remote, but connected to a wireless device so as to assure proper operation of the overall system. In accordance with an aspect of the present invention, the radar detection function includes a fail safe mechanism to ensure reliable operation.

In accordance with an aspect of the present invention, there is disclosed herein an apparatus for primary spectrum user detection. The apparatus comprises a wireless receiver for receiving signals on a predetermined frequency (or frequencies). The apparatus also has spectrum detection logic for examining the signals received on the predetermined frequency to determine whether a primary spectrum user signal was received on the frequency. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. The apparatus includes a network interface for transmitting at least one message from the group consisting of "clear" and "primary spectrum user detected" to another device on the network responsive to the spectrum detection device determining whether a primary spectrum user signal was received.

In accordance with an aspect of the present invention, there is disclosed herein an apparatus for primary spectrum user detection. The apparatus comprises means adapted for receiving signals on a predetermined frequency or frequencies, means adapted for examining the signals received to determine whether a primary spectrum user signal was received, and means adapted for transmitting at least one message from the group consisting of "clear" and "primary spectrum user detected" to another device on the network responsive to the spectrum detection device determining whether a primary spectrum user signal was received.

In accordance with an aspect of the present invention, there is disclosed herein a wireless device. The wireless device comprises a wireless transceiver. Dynamic frequency selection (DFS) logic is coupled to the wireless transceiver and operative for selecting an operating frequency for the wireless transceiver. A network interface is coupled to the dynamic frequency selection logic and responsive to receiving a signal from a remote primary spectrum user detector to forward the signal from the remote primary spectrum user detector to the dynamic frequency selection logic. The dynamic frequency selection logic is responsive to the signal from the remote primary spectrum user detector for selecting the operating frequency for the wireless transceiver. The access point further comprises a timer coupled to the network interface for determining the elapsed time from the last signal received from the remote primary spectrum user detector and primary spectrum user detection logic coupled to the timer and the dynamic frequency selection logic responsive to the timer to activate after a predetermined time has elapsed. The dynamic frequency selection logic is responsive to the primary spectrum user for selecting the operating frequency after the predetermined time has elapsed.

In accordance with an aspect of the present invention there is disclosed herein a wireless device. The wireless device comprises means adapted for sending and receiving wireless signals, dynamic frequency selection means coupled to the means adapted for sending and receiving wireless signals for selecting an operating frequency for the means adapted for sending and receiving wireless signals, means adapted for communicating on a network coupled to the dynamic frequency selection means and responsive to receiving a signal from a remote primary spectrum user detector to forward the signal from the remote primary spectrum user detector to the dynamic frequency selection means, timing means for determining the elapsed time from the last signal received from the remote primary spectrum user detector coupled to the network interface, and primary spectrum user detection means coupled to the timing means and the dynamic frequency selection means responsive to the timing means to activate after a predetermined time has elapsed. The dynamic frequency selection means is responsive to the signal from the remote primary spectrum user detector for selecting the operating frequency for the wireless transceiver. Furthermore, the dynamic frequency selection means is responsive to the primary spectrum user for selecting the operating frequency after the predetermined time has elapsed.

In accordance with an aspect of the present invention, there is disclosed herein a method for primary spectrum user detection. The method comprises monitoring a channel, determining whether a primary spectrum user is using the channel and sending a message indicative of whether primary spectrum user is using the channel within a predetermined time period.

In accordance with an aspect of the present invention, there is disclosed herein an access point to detect a primary spectrum user. The method comprises waiting for a message from a remote primary spectrum user detector indicative of whether a primary spectrum user has been detected on a channel. The method further comprises selecting a channel responsive to receiving a message from the remote primary spectrum. The method determines an elapsed time after the message has been received from the remote primary spectrum user detector and further comprises activating a second primary spectrum user detector responsive to the determining step determining the elapsed time exceeded a predetermined time.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrate several aspects of the present invention, and together with the description serve to explain the principles of the invention.

DETAILED DESCRIPTION OF INVENTION

Figure 1:
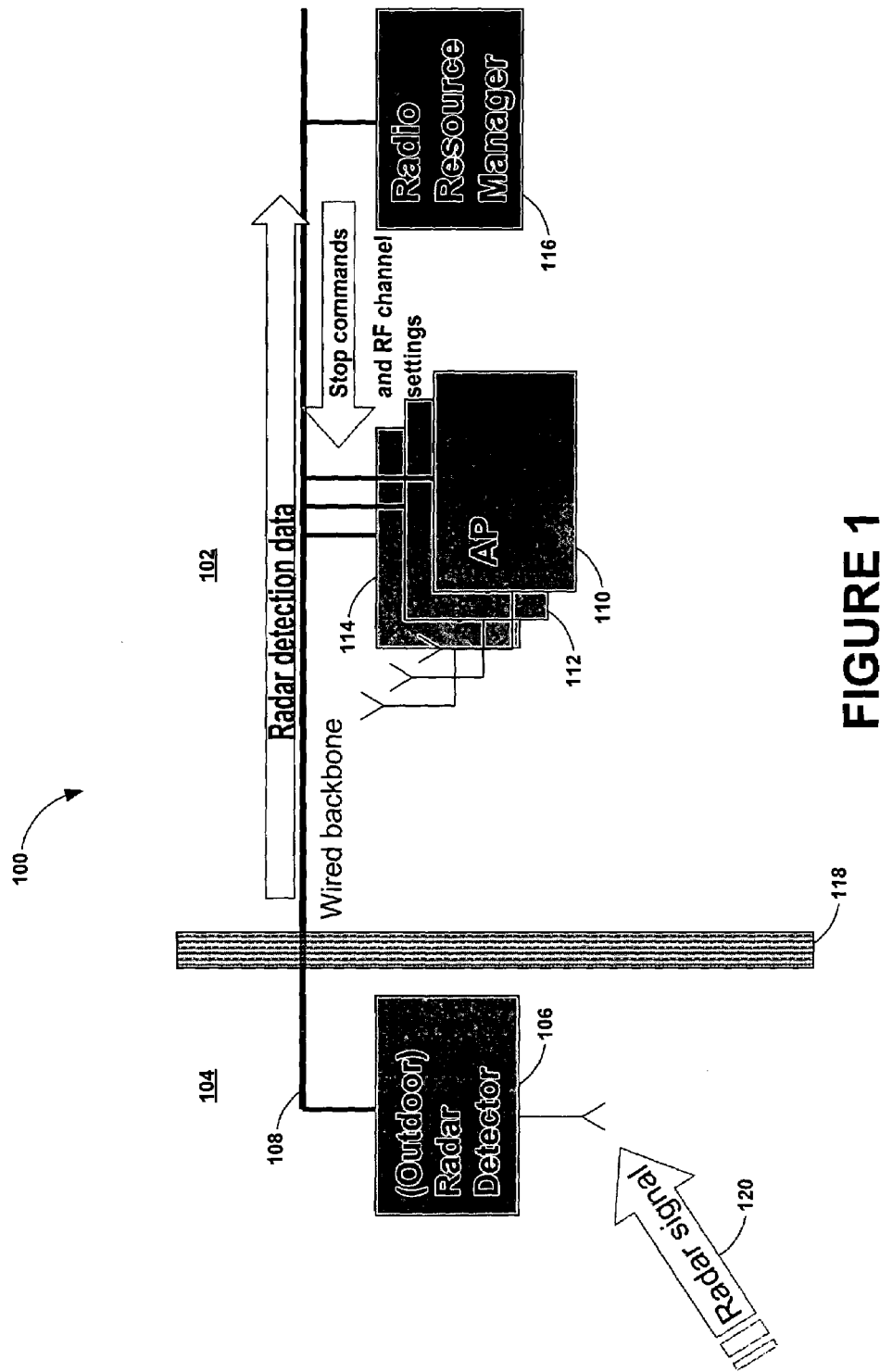
FIG. 1 is a block diagram of a system with an external primary spectrum user detector and radio resource manager.

Throughout this description, the preferred embodiment and examples shown should be considered as exemplars, rather than limitations, of the present invention. An aspect of the present invention contemplates an External Primary Spectrum User Detector (ESUD) to perform the role of detecting external primary spectrum users, such as radar detection. The ESUD function can be performed by a remote standalone device or be incorporated into one or more components in a wireless network. The ESUD can belong to a group of network or user devices. The relationship between the ESUD and other devices can be established by means of a cryptographic signature on messages generated by the ESUD. This relationship can be established when the ESUD device is installed, or when a user device is activated or installed. There are several means available for a user device to detect an ESUD device belonging to its group or network and can include strong mechanisms such as public key based message authentication.

ESUD installation includes assigning the device a frequency band to be scanned for primary spectrum user signals as well as specifying the type of primary spectrum user signals, such as radar, to be detected. The user devices can be any network component, including infrastructure nodes, including but not limited to wireless access points or wireless client devices such as notebook computers or Personal Digital Assistants (PDAs).

The ESUD scans a selected portion of radio spectrum sufficient to assure fast and reliable detection of emissions from primary spectrum user systems operating in the given frequency range. Once activated, an ESUD will scan its assigned frequency band and emit two types of messages, a "clear" or "all clear" message and a "primary spectrum user detected" message. The "clear" or "all clear" messages are generated continually and at a rate that is appropriate for the primary spectrum user to be detected and protected from interference by the user devices. The "primary spectrum user detected" messages are generated by the ESUD once a primary spectrum user has been detected and for as long as primary spectrum user signals remain present. The primary spectrum user detected messages can include information indicative of the frequency at which the primary spectrum user is strongest and/or centered. More than one indication may be present in the same primary user detected messages. User devices listen for all messages sent out by ESUDs belonging to the group or network. Absence of any message from an ESUD belonging to a group or network will cause the user devices to activate their internal primary spectrum user detectors until ESUD signals are received. Detection of "all clear" messages allows user devices to operate across the whole frequency range addressed by the ESUD. Detection of "primary spectrum user detected" messages cause user devices to stop or defer operation at the frequencies indicated by the primary spectrum user detected messages consistent with the applicable rules for avoiding interference into the primary spectrum user systems.

FIG. 1 is a block diagram of a system 100 with an external primary spectrum user detector (Radar Detector) 106 and radio resource manager 116. System 100 in FIG. 1 illustrates a network wherein the access points 110, 112, 114 and radio resource manager (RRM) 116 are inside 102 a building and the primary spectrum user detector 106 is outside 104 the building, separated by wall 118. Radar signal 120 is detected by Radar Detector 106. Radar Detector 106 conveys the radar detection data to the radio resource manager 116 across wired backbone 108. Although the examples described herein describe backbone 108 as being a wired backbone, this is merely for ease of illustration and not necessary for the present invention, as the present invention is also capable of functioning on wireless backbones such as mesh networks. Radar resource manager 116 receives the detection data from radar detector 106 and issues any stop commands (i.e., commands to stop operation on a particular channel) and appropriate RF channel settings to access points 110, 112, 114.

Since it is likely that radar signals would be generated outside 104 the building as opposed to inside 102 the building, an aspect of system 100 is that one (or more) radar detectors outside 104 of a building are utilized to detect radar signals. An aspect of the present invention is that radar detectors can be located at the perimeter of a network.

System 100 offloads primary spectrum user detection from access points 110, 112, 114 to radar detector 106. Radio resource manager 116 can determine which channels access points 110, 112, 114 can operate. In the event that radio resource manager 116 does not receive signals from radar detector 106 within a predetermined time period, it may instruct access points 110, 112, 114 to activate their internal primary spectrum user detectors (e.g., radar detectors). Similarly, if an access point 110, 112, 114 does not receive a message from radio resource manager 116 within a predetermined amount of time then the access point 110, 112, 114 activates its internal primary spectrum user detector.

Radar detector 106 and radio resource manager 116 are configurable to send "all clear" or "primary spectrum user detected" messages at any desired interval. For example, primary spectrum user detected messages can be sent more frequently than "all clear" messages.

For systems using multiple frequencies or channels (e.g., an OFDM system), radar detector 106 and radio resource manager 116 can be configured to send messages for frequencies that primary spectrum users were detected separately and/or at different intervals than messages indicative of frequencies that are clear. Alternatively, radar detector 106 and radio resource manager 116 can periodically send messages indicating the status of all frequencies in use by network 100.

Figure 2:
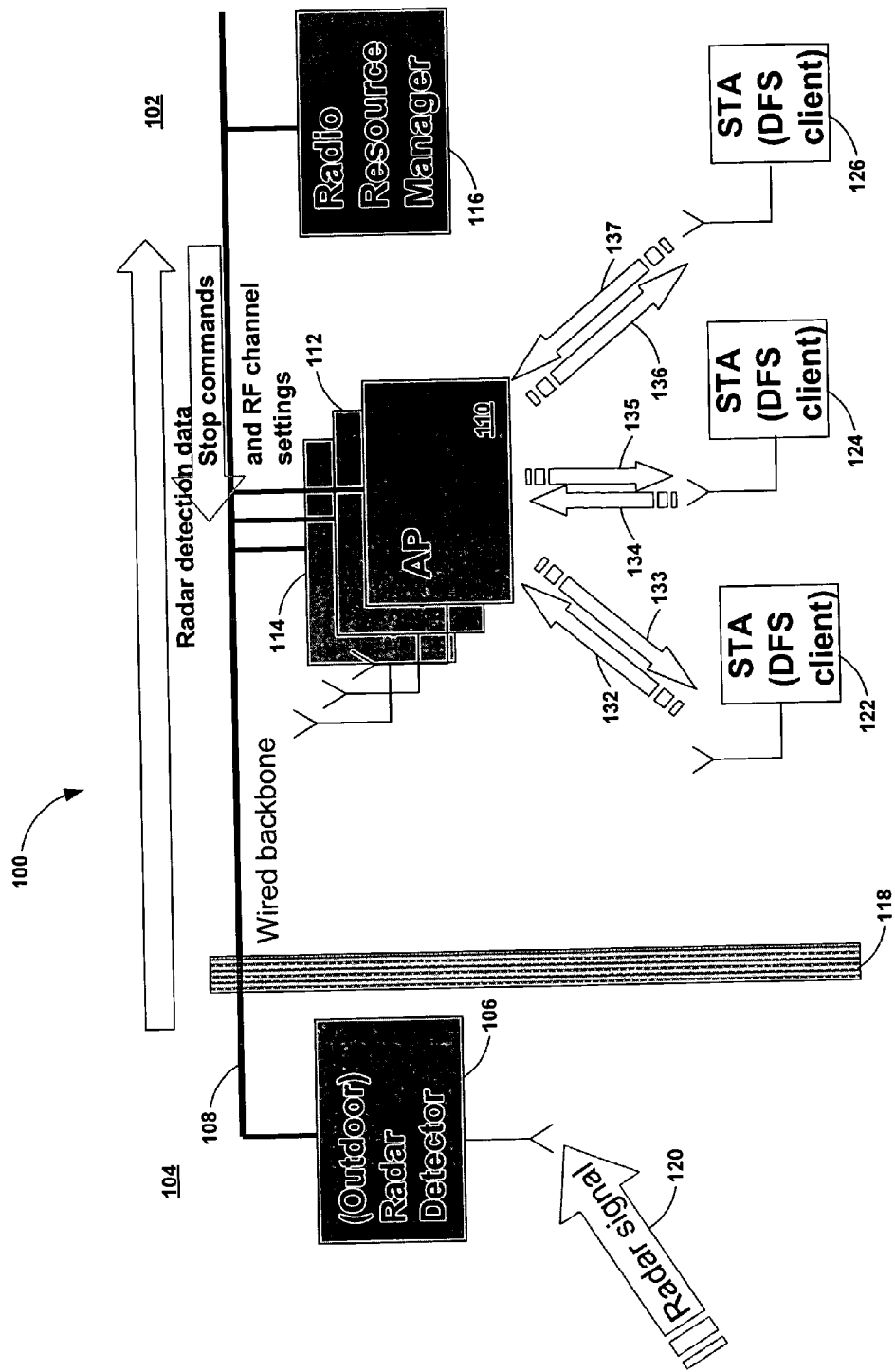
FIG. 2 is a block diagram of a system with an external primary spectrum user detector, radio resource manager and wireless stations.

FIG. 2 is a block diagram of a system 100 with an external primary spectrum user detector 106, radio resource manager 116 and wireless stations 122, 124, 126. When radio resource manager 116 determines operating frequencies for access points 110, 112, 114, access points 110, 112, 114 can communicate these frequencies to wireless clients 122, 124, 126, enabling the DFS logic within clients 122, 124, 126 to select the appropriate frequency. For example, as illustrated in FIG. 2, AP 110 sends a signal 133, 135, 136 to clients 122, 124, 126 respectively to select the appropriate frequency. In addition, clients 122, 124, 126 can send messages 132, 134, 137 respectively acknowledging messages 133, 135, 136.

Figure 3:
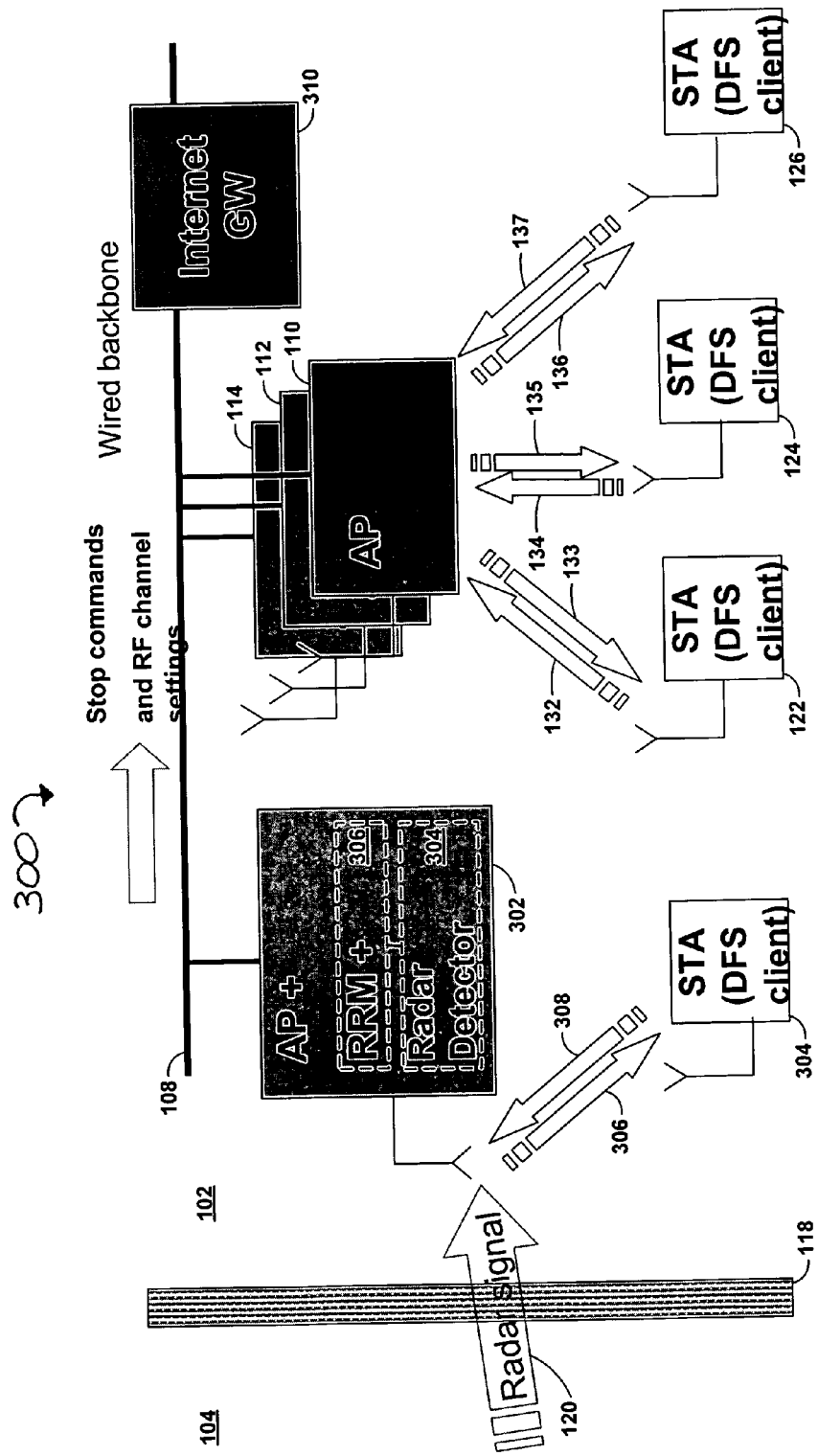
FIG. 3 is a block diagram of a system with the primary spectrum detection and radio resource management functions are incorporated into one access point on a network with a plurality of access points.

FIG. 3 is a block diagram of a system 300 with the primary spectrum detection (radar detector) 304 and radio resource management 306 functions are incorporated into one access point 302 on a network with a plurality of access points. As illustrated, radar signal 120 which originates outside 104 of the building is detected by a radar detector 304 contained within access point 302 inside 102 of the building. Radio resource manager 306 which is also a part of access point 302 receives data from radar detector 304 indicative of the radar signal 120. Radio resource manager 306 then sends a message to access point 302 and also access points 110, 112 and 114 to avoid the frequency on which radar signal 120 occupies. AP 302 is also in communication with wireless client 304. AP 302 can send a message 306 to wireless client 304 to dynamically select a frequency based on messages received from radio resource manager 306 or radar detector 304. Wireless messages 308 are sent from client 304 to AP 302 are sent via path 308.

Furthermore, radar detector 304 can be configured to send clear messages and primary spectrum user detected messages at periodic intervals. If desired, radio resource manager 306 can send messages along wired backbone 108 to Internet gateway 310 to propagate messages outside of network 100.

Figure 4:
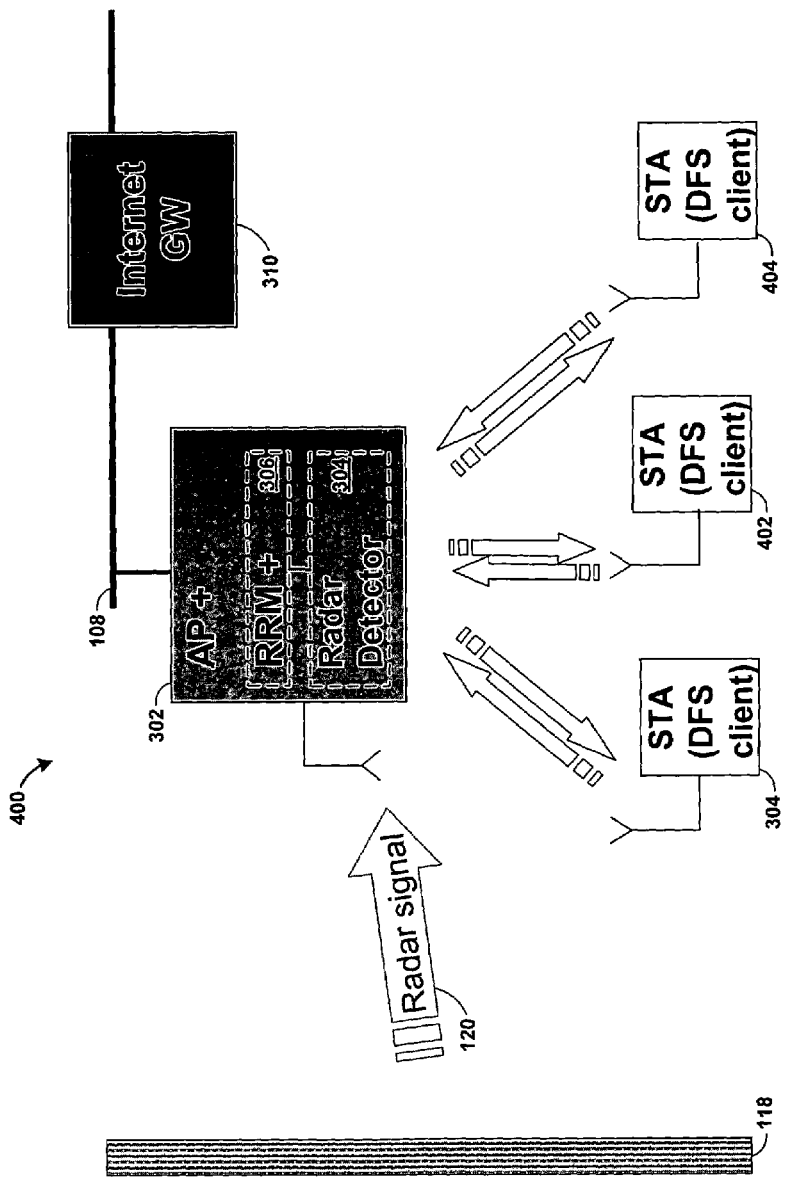
FIG. 4 is a block diagram of a system with the primary spectrum detection and radio resource management functions incorporated into an access point on a network with a single access point.

FIG. 4 is a block diagram of a system 400, which is a smaller implementation that has only a single access point 302 with the primary spectrum user detector (radar detector) 304 and radio resource management 306 functions incorporated into access point 302. When radar signal 120 is detected by radar detector 304, radar detector 304 communicates with radio resource manager 306 that a radar signal 120 was received on a protected frequency. Radio resource manager 306 dynamically selects frequencies for access point 302 to avoid radar signal 120. Access point 302 sends a message to clients 304, 402, 404 to update their dynamic frequency selection functions to avoid radar signal 120. If desired, access point 302 can send a message through Internet gateway 310 coupled to access point 302 via wired backbone 108 to alert other segments of network 400 about the detection of radar signal 120, or if desired, that no radar signal or other primary spectrum user signal has been detected.

Figure 5:
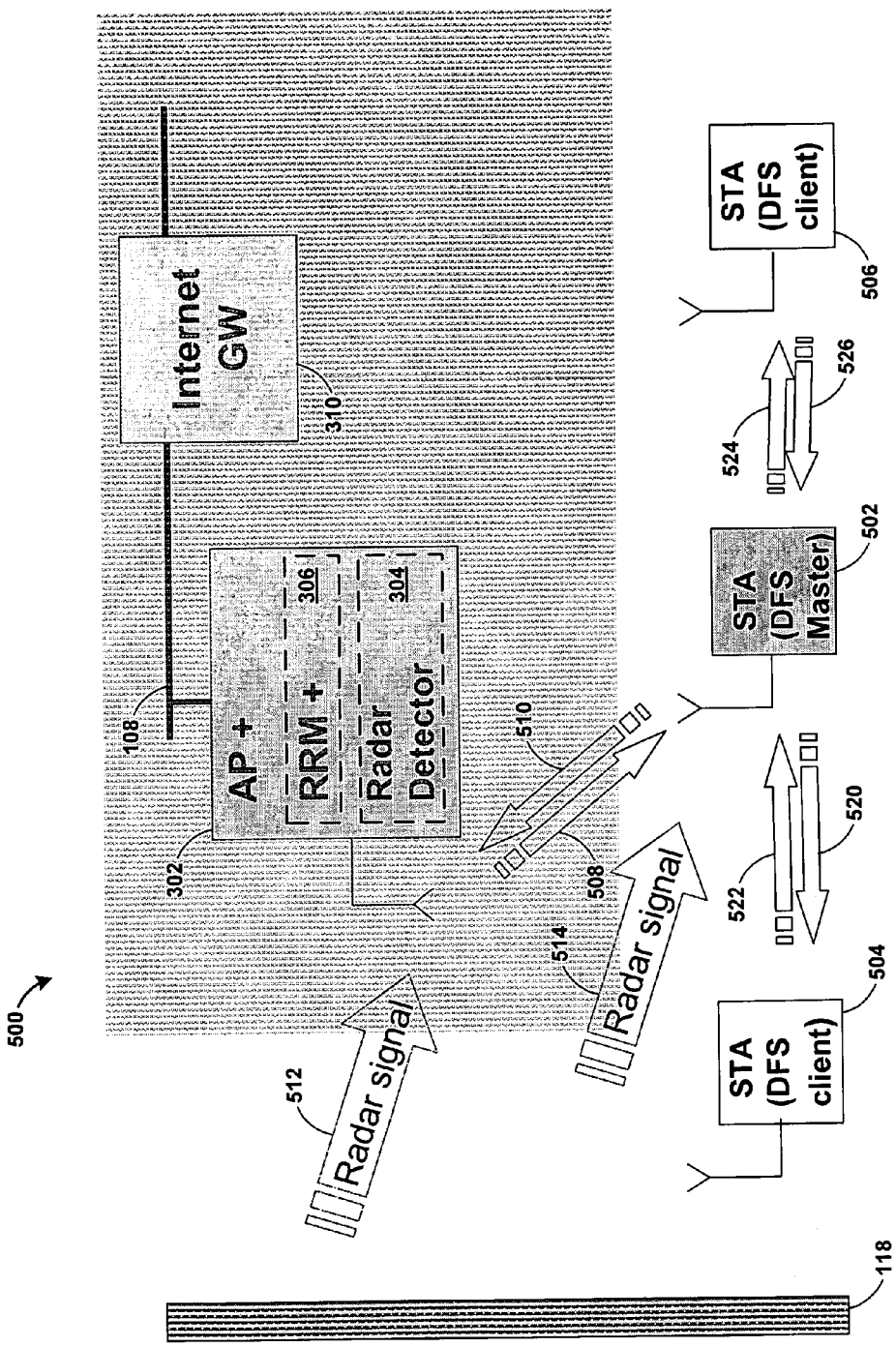
FIG. 5 is a block diagram of a system with the primary spectrum detection and radio resource management functions are incorporated into an access point on a network with a single access point and also has a wireless station with a primary spectrum user detector.

FIG. 5 is a block diagram of a system 500 in accordance with an aspect of the present invention. System 500 uses a single access point 302 that also has a radar detector 304 and radio resource manager 306. Radar detector 304 is capable of detecting radar signals, such as radar signal 512. In addition, wireless client 502 is also a dynamic frequency selection master and is also capable of detecting radar signals, such as radar signal 514. As illustrated, access point 302 and wireless client 502 exchange messages 508, 510 indicative of whether a radar signal, such as radar signal 512 and/or radar signal 514 was detected by one or both of access point 302 and wireless client 502. Wireless client 502 exchanges messages 520, 522 with wireless client 504 and messages 524, 526 with wireless client 506 to avoid frequencies being utilized by radar signal 512 and 514.

Figure 6:
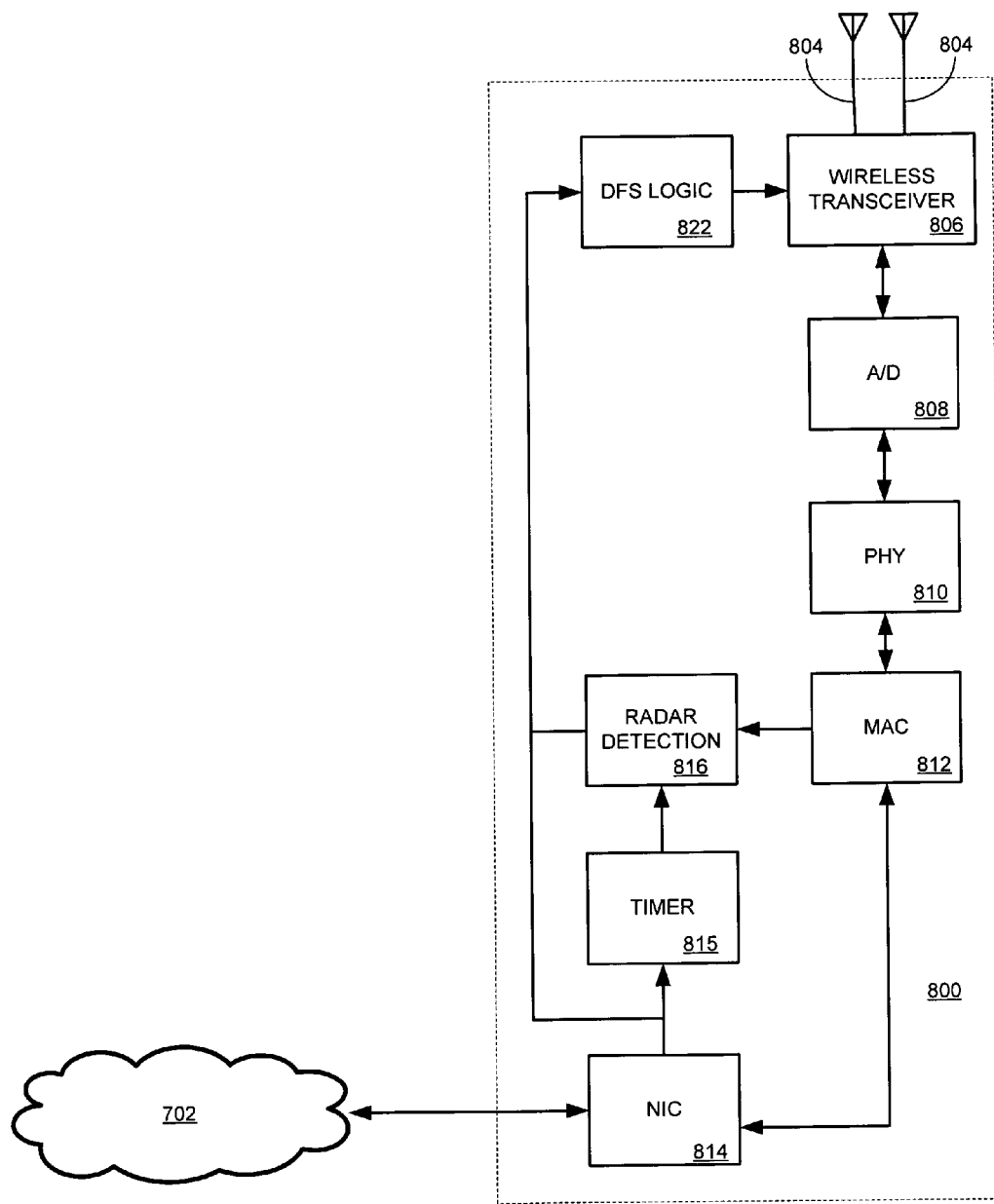
FIG. 6 is a block diagram of an exemplary DFS device.

FIG. 6 is a block diagram of an exemplary DFS device, such as an access point 800. Device 800 comprises a wireless transceiver 806 that is coupled to antennas 804 for at least one of the group consisting of sending and receiving signals. Wireless transceiver performs analog processing of signals such as frequency conversion and modulation/demodulation. Analog to digital ("A/D" which may also further comprise a digital to analog "D/A") converter 808 is coupled to wireless transceiver 806 for converting analog signals received by wireless transceiver 806 to digital signals, and digital signals to be sent by wireless transceiver 806 to analog signals.

PHY 810 and MAC 812 further process the signals. For received signals PHY 810 and MAC 812 determine whether the signals are for device 800. For sending signals, PHY 810 and MAC 812 ensure the signals are properly formatted.

Network interface (NIC) 814 exchanges signals between MAC 812 and network 702 as needed. In addition, NIC 814 is configured to receive signals from an external primary spectrum user detector (not shown, for example primary spectrum user detector 700 in FIG. 7). Signals from a primary spectrum user detector are routed DFS logic 822, which can switch the operating frequencies of wireless transceiver 806 so that wireless transceiver 806 avoids operating on channels that a primary spectrum user was detected.

Timer 815 keeps track of the elapsed time between messages from an external primary spectrum user detector. Timer 815 comprises logic that activates radar detection logic 816 if the elapsed time after the last message received from the external primary spectrum user detector exceeds a certain threshold, or if NIC 814 loses communication with network 702. This provides backup protection for wireless device 800 in the event that communication is lost with the external primary spectrum user detector or with network 702. Once activated, radar detection logic 816 receives signals from MAC 812 and determines whether the signals are indicative of radar or any other type of desired primary spectrum user activity. Radar detection logic 816 updates DFS 822 with the results of its detection efforts. Radar detection logic 816 operates until NIC 814 again receives data from an external primary spectrum user detector.

Figure 7:
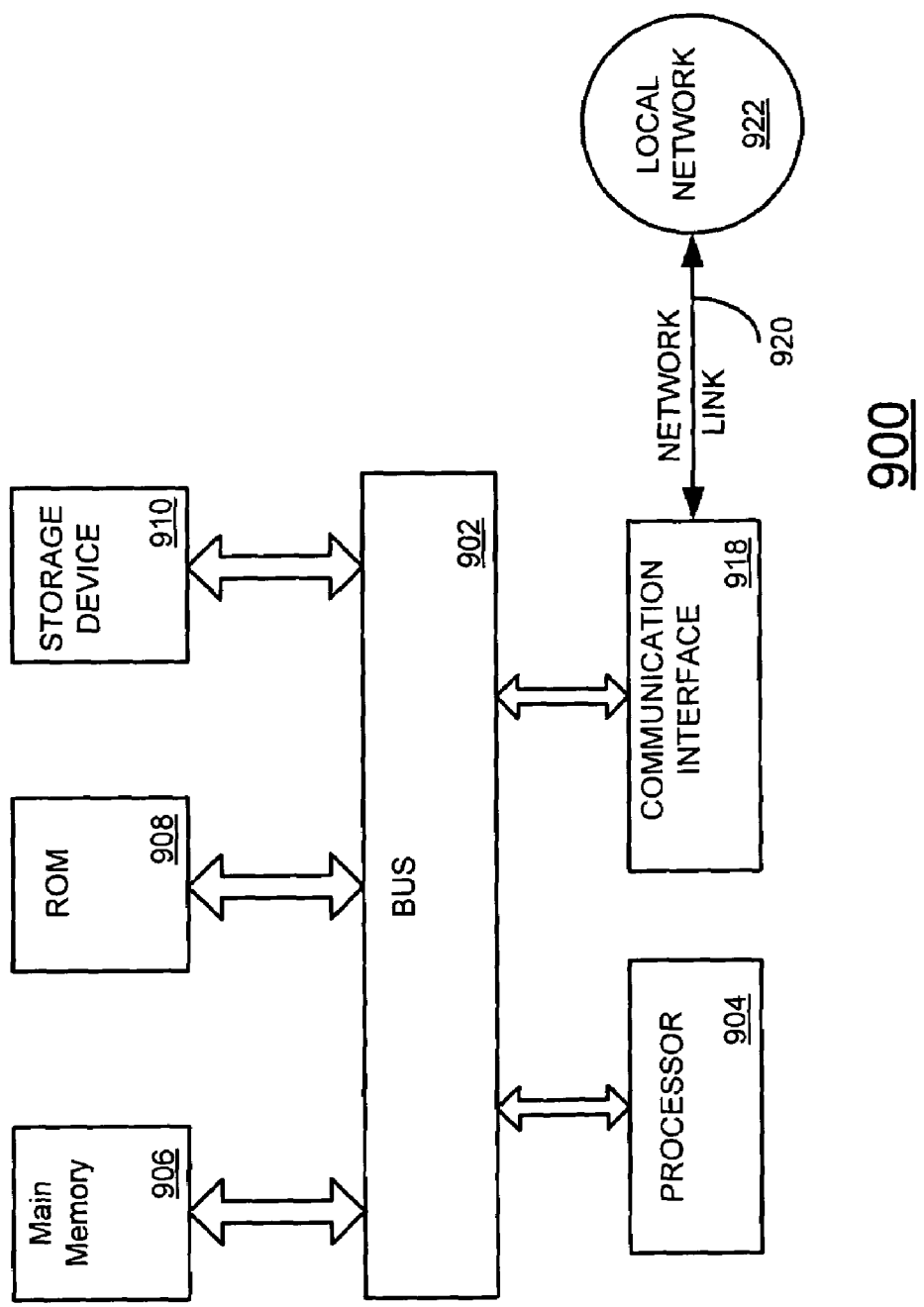
FIG. 7 is a block diagram of a computer system configured to implement an embodiment of the present invention.

FIG. 7 is a block diagram that illustrates a computer system 900 upon which an embodiment of the invention may be implemented. Computer system 900 may be utilized to implement radar detector 106, access points 110, 112, 114 and radio resource manager 116 of FIG. 1; wireless clients 122, 124, 126 of FIG. 2; access point 302 and wireless client 304 of FIG. 3; wireless client and DFS master 502 of FIG. 5; the various components of User/Network Manager 602, DFS master 604 other DFS master 620 and DFS client 620 of FIG. 6; primary spectrum user detector 700 of FIG. 7; and wireless device of FIG. 8.

Computer system 900 includes a bus 902 or other communication mechanism for communicating information and a processor 904 coupled with bus 902 for processing information. Computer system 900 also includes a main memory 906, such as random access memory (RAM) or other dynamic storage device coupled to bus 902 for storing information and instructions to be executed by processor 904. Main memory 906 also may be used for storing a temporary variable or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

An aspect of the present invention is related to the use of computer system 900 for detection of primary spectrum users. According to one embodiment of the invention, detection of primary spectrum users is provided by computer system 900 in response to processor 904 executing one or more sequences of one or more instructions contained in main memory 906. Such instructions may be read into main memory 906 from another computer-readable medium, such as storage device 910. Execution of the sequence of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to non-volatile media, volatile media, and transmission media. Non-volatile media include for example optical or magnetic disks, such as storage device 910. Volatile media include dynamic memory such as main memory 906. Transmission media include coaxial cables, copper wire and fiber optics, including the wires that comprise bus 902. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 904 for execution. For example, the instructions may initially be borne on a magnetic disk of a remote computer. The remote computer can load the instructions into its dynamic memory and send the instructions over a telephone line using a modem or a network connection.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. Computer system 900 can send messages and receive data, including program codes, through the network(s), network link 920, and communication interface 918.

Figure 8:
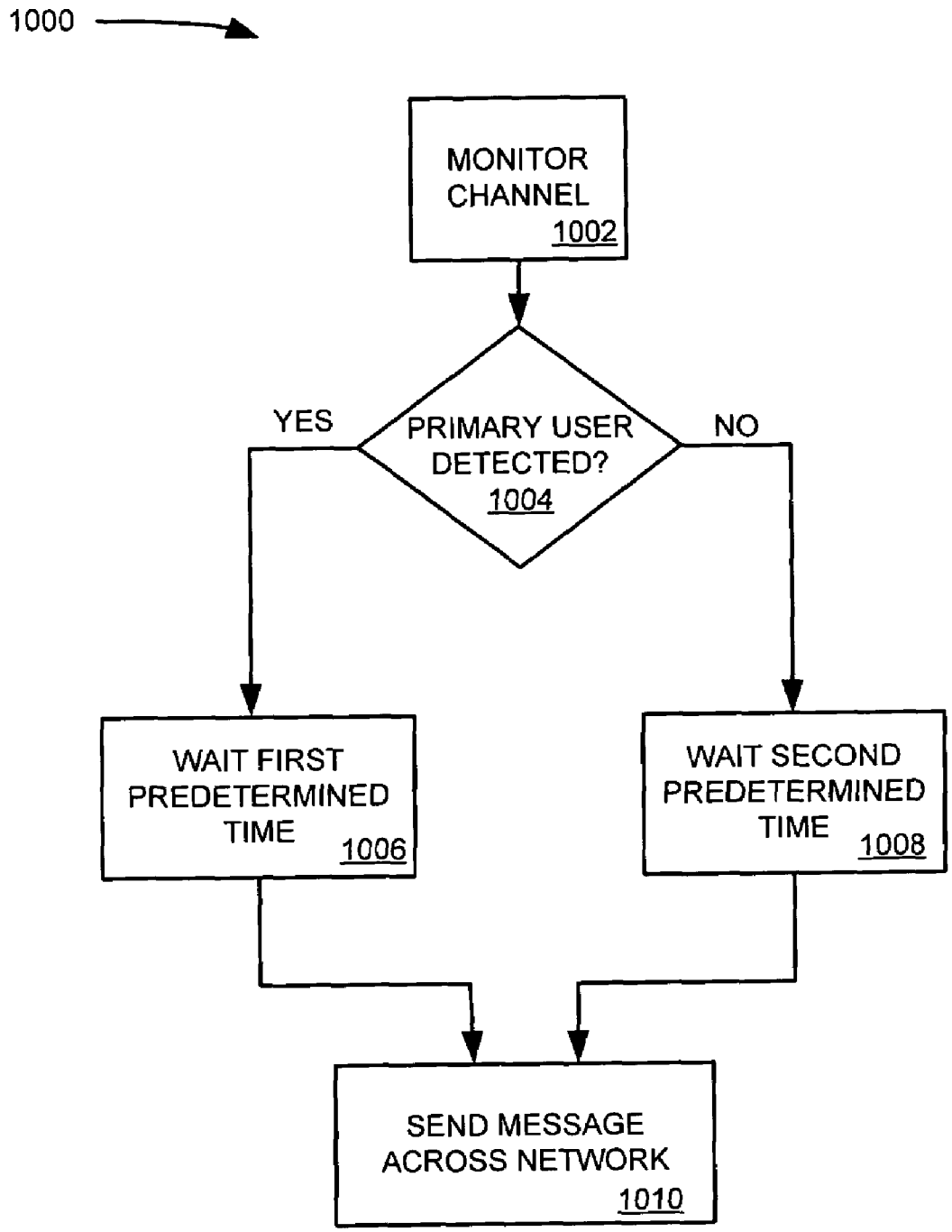
FIG. 8 is a block diagram of a methodology of operation for a primary spectrum user detector.
Figure 9:
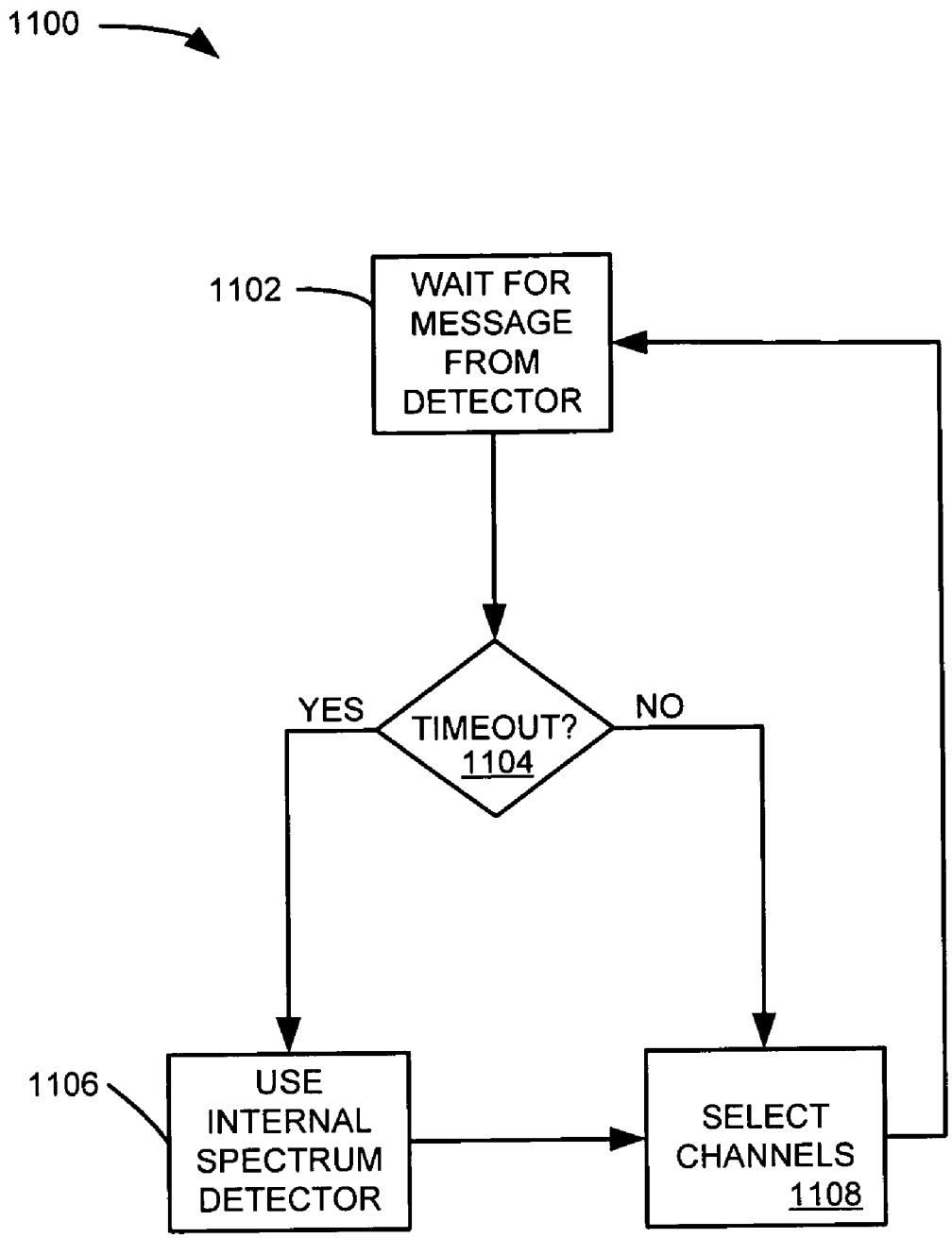
FIG. 9 is a block diagram of a methodology for operation for a wireless device operable to receive primary spectrum user data from an external device.
Figure 2:
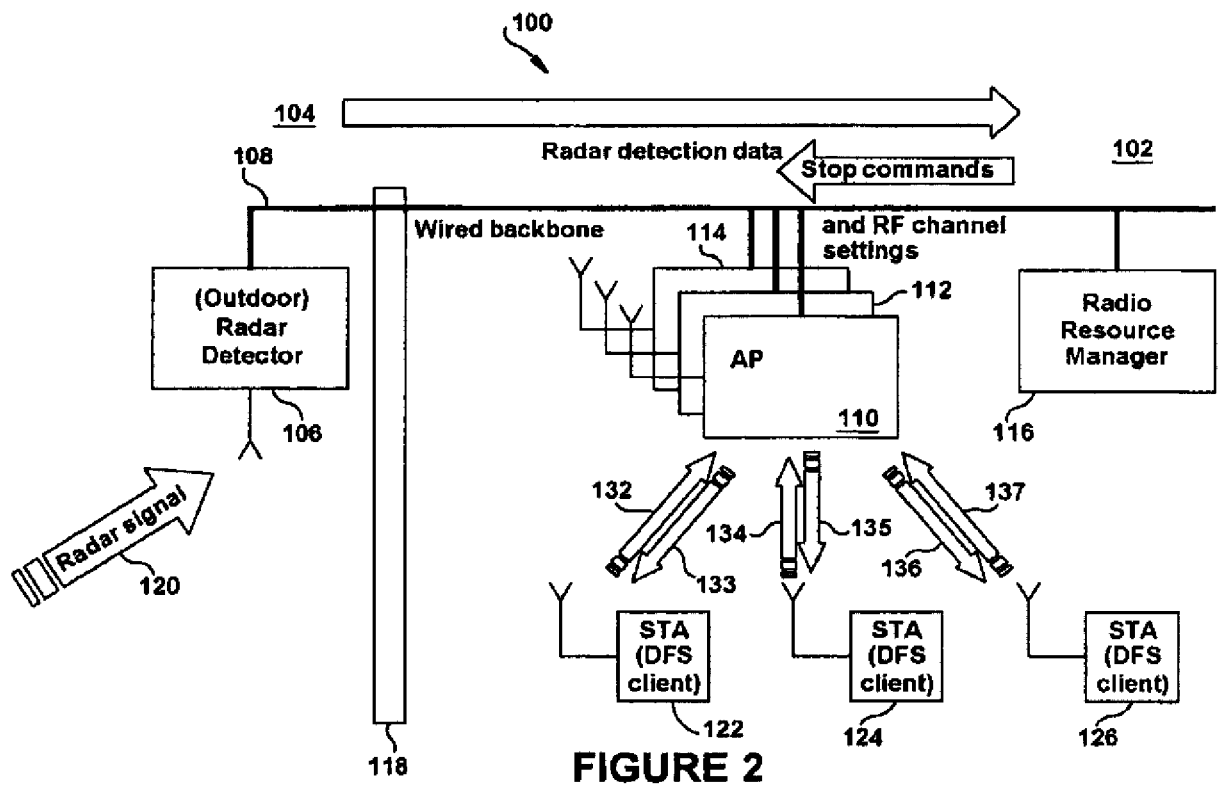
Figure 3:
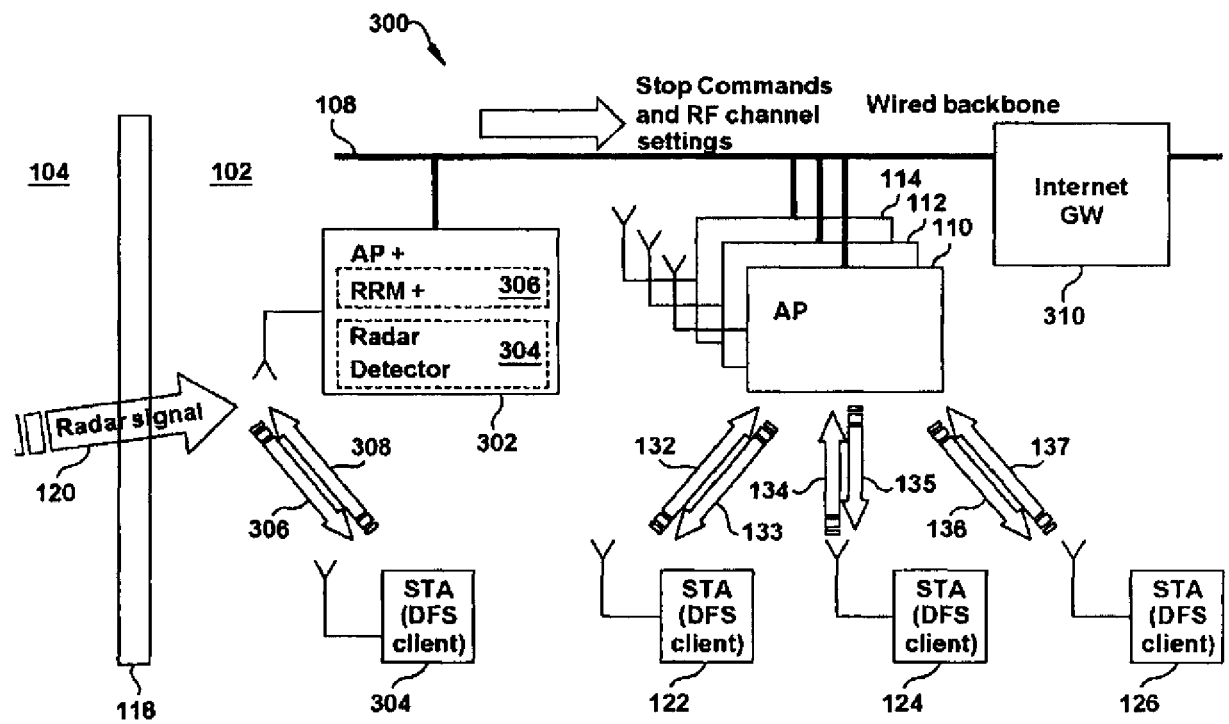
Figure 4:
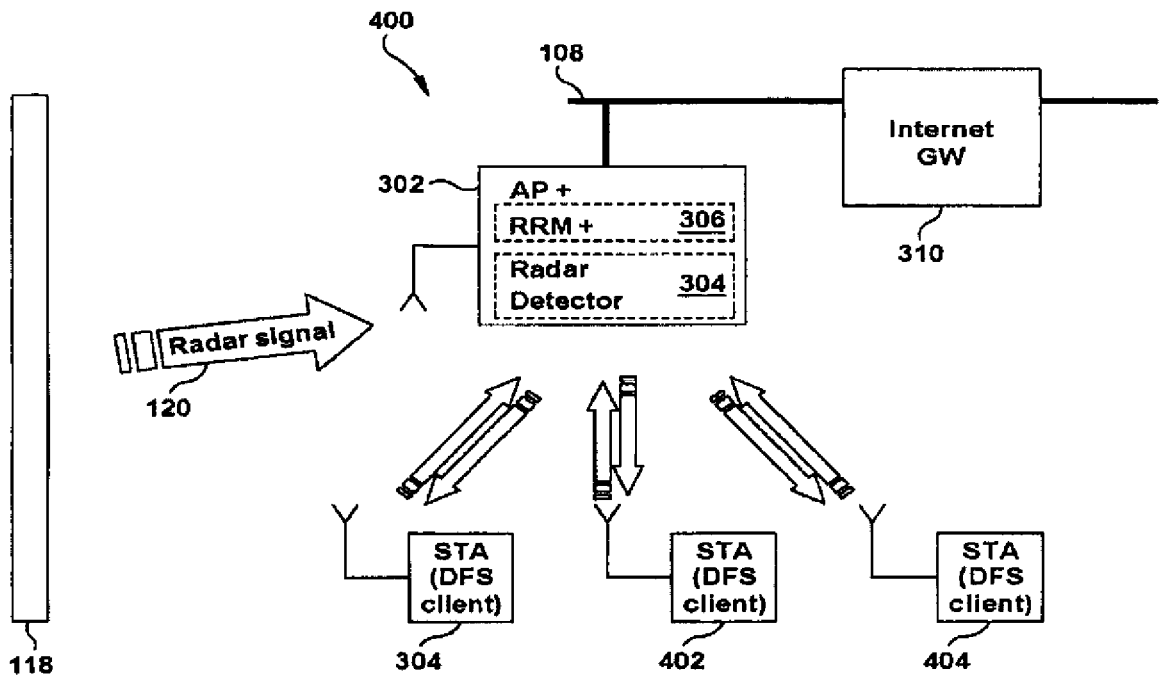

In view of the foregoing structural and functional features described above, methodologies in accordance with various aspects of the present invention will be better appreciated with reference to FIGS. 8-9. While, for purposes of simplicity of explanation, the methodologies of FIGS. 8-9 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 8 is a block diagram of a methodology 1000 of operation for a primary spectrum user detector. At 1002, the primary spectrum user detector monitors a channel. The primary may be configurable to operably select one or a plurality of channels for monitoring. At 1004, it is determined whether a primary spectrum user has been detected. This function can be performed at periodic, configurable intervals. The intervals can also be configured based on past channel performance. For example, if primary spectrum user activity has previously been detected on a channel, step 1004 can be configured to operate more frequently on that channel then for a channel wherein no primary spectrum user activity has been detected, or recently detected within a predefined time.

If at 1004 a primary user has been detected (YES), then at 1006 methodology 1000 waits a first predetermined time and at 1010 a message reporting the activity is sent across a network. If at 1004 no primary user activity has been detected (NO), then at 1008 methodology 1000 waits a second predetermined time and at 1010 a message is sent indicating the channel is clear.

The time interval of the first and second interval is configurable to any desired interval. For example, the first interval can be configured to be shorter than the second interval to help ensure devices avoid channels wherein primary spectrum user activity has been detected. Alternatively, the second interval can be set shorter, or the first and second interval can be set to the same time.

For embodiments wherein a plurality of channels are being monitored, messages can be sent separately at 1010 after waiting a first interval at 1008 for those channels that have primary spectrum activity than messages sent at 1010 after waiting the second interval for channels wherein no primary spectrum user activity has been detected. Alternatively, at 1010 a single message can be sent indicative of the activity for all channels (whether each channel is clear or a primary spectrum user was detected) by use of a bitmap, array or other similar technique.

FIG. 9 is a block diagram of a methodology 1100 of operation for a wireless device operable to receive primary spectrum user data from an external device. The wireless device can be an access point configured to receive DFS data from a radio resource manager or a wireless client.

At 1102 the device waits for a message from a remote primary spectrum user detector. The device selects its operating channels responsive to the message from the remote primary spectrum user detector. At 1104, the elapsed time since the last message is determined.

If the elapsed time has exceeded a predetermined time period (YES) then at 1106 an internal spectrum user detector is activated. At 1108, the channels for the device are selected based on data received from the internal spectrum user detector. If at 1102 a message is again received from the external spectrum user detector, then internal spectrum user detector can be deactivated.

If at 1104 it is determined that the elapsed time when the last message was received from the external spectrum user detector has not been exceeded (NO) then at 1108 the channels for the device are selected based on the data received from the external spectrum user detector. If the internal spectrum user detector is active, it is deactivated.

An aspect of methodology 1100 is that it provides protection from failure of either the network connected to the device or of the external spectrum user detector. By determining whether a predetermined elapsed time has passed since the last message was received from the external detector, the device is enabled to activate an internal spectrum user detector to ensure reliable primary spectrum user detection. When communication with the external primary spectrum user detector is again established, the internal detector can be deactivated.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

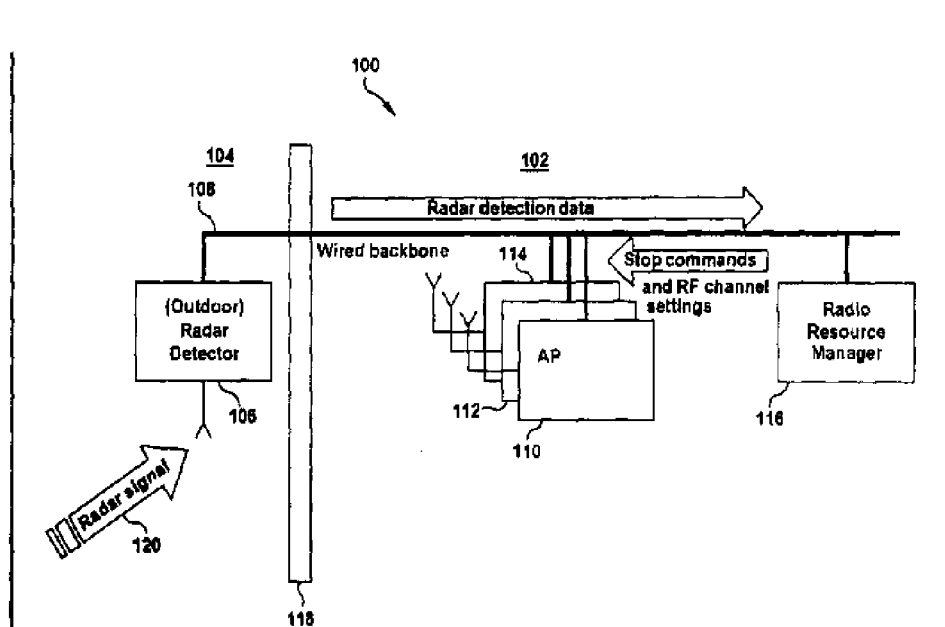

The invention claimed is:

1. A wireless device, comprising:
    a wireless transceiver;
    dynamic frequency selection logic coupled to the wireless transceiver for selecting an operating frequency for the wireless transceiver;
    a network interface coupled to the dynamic frequency selection logic and responsive to receiving a signal from a remote primary spectrum user detector to forward the signal from the remote primary spectrum user detector to the dynamic frequency selection logic;
    a timer coupled to the network interface for determining the elapsed time from the last signal received from the remote primary spectrum user detector; and
    primary spectrum user detection logic coupled to the timer and the dynamic frequency selection logic responsive to the timer to activate after a predetermined time has elapsed;
    wherein the dynamic frequency selection logic is responsive to the signal from the remote primary spectrum user detector for selecting the operating frequency for the wireless transceiver; and
    wherein the dynamic frequency selection logic is responsive to the primary spectrum user detection logic for selecting the operating frequency while the primary spectrum user detection logic is active.

2. A wireless device according to claim 1, wherein the signal from the remote primary spectrum user detector received by the network interface is one of the group consisting of a "frequency clear" and "primary spectrum user detected".

3. A wireless device according to claim 2 wherein the timer activates the primary spectrum user detection logic when one of the group consisting of a frequency clear message has not been received within a first predetermined interval and a primary spectrum user detected message has not been within a second predetermined interval.

4. A wireless device according to claim 1, wherein the dynamic frequency selection logic authenticates a crypto graph signature of the signal.

5. A wireless device according to claim 1, wherein the dynamic frequency selection logic is authenticates the signal using public key based message authentication.

6. A wireless device, comprising:
    means adapted for sending and receiving wireless signals;
    dynamic frequency selection means coupled to the means adapted for sending and receiving wireless signals for selecting an operating frequency for the means adapted for sending and receiving wireless signals;
    means adapted for communicating on a network coupled to the dynamic frequency selection means and responsive to receiving a signal from a remote primary spectrum user detector to forward the signal from the remote primary spectrum user detector to the dynamic frequency selection means;
    timing means for determining the elapsed time from the last signal received from the remote primary spectrum user detector coupled to the network interface; and
    primary spectrum user detection means coupled to the timing means and the dynamic frequency selection means responsive to the timing means to activate after a predetermined time has elapsed and no signal has been received from the remote primary spectrum user detector, the primary spectrum user detection means remaining active until a signal is received from the remote primary spectrum user detector;
    wherein the dynamic frequency selection means is responsive to the signal from the remote primary spectrum user detector for selecting the operating frequency for the wireless transceiver; and
    wherein the dynamic frequency selection means is responsive to the primary spectrum user means for selecting the operating frequency while the primary spectrum user means is active.

7. A wireless device according to claim 6, wherein the signal from the remote primary spectrum user detector received by the means adapted for communicating on a network is one of the group consisting of "frequency clear" and "primary spectrum user detected".

8. A wireless device according to claim 7, wherein the timing means activates the primary spectrum user detection means when one of the group consisting of a "frequency clear" message has not been received within a first predetermined interval and a "primary spectrum user detected" message has not been within a second predetermined interval.

9. A wireless device according to claim 6, wherein the dynamic frequency selection means authenticates a crypto graph signature of the signal.

10. A wireless device according to claim 6, wherein the dynamic frequency selection means authenticates the signal using public key based message authentication.

* * * * *

UNITED STATES PATENT AND TRADEMARK OFFICE
CERTIFICATE OF CORRECTION

PATENT NO. : 7,548,750 B2  Page 1 of 6
APPLICATION NO. : 11/225719
DATED : June 16, 2009
INVENTOR(S) : Johannes P. Kruys and Christopher G. Meil It is certified that error appears in the above-identified patent and that said Letters Patent is hereby corrected as shown below:

Title page should be deleted and substitute therefor the attached title page.

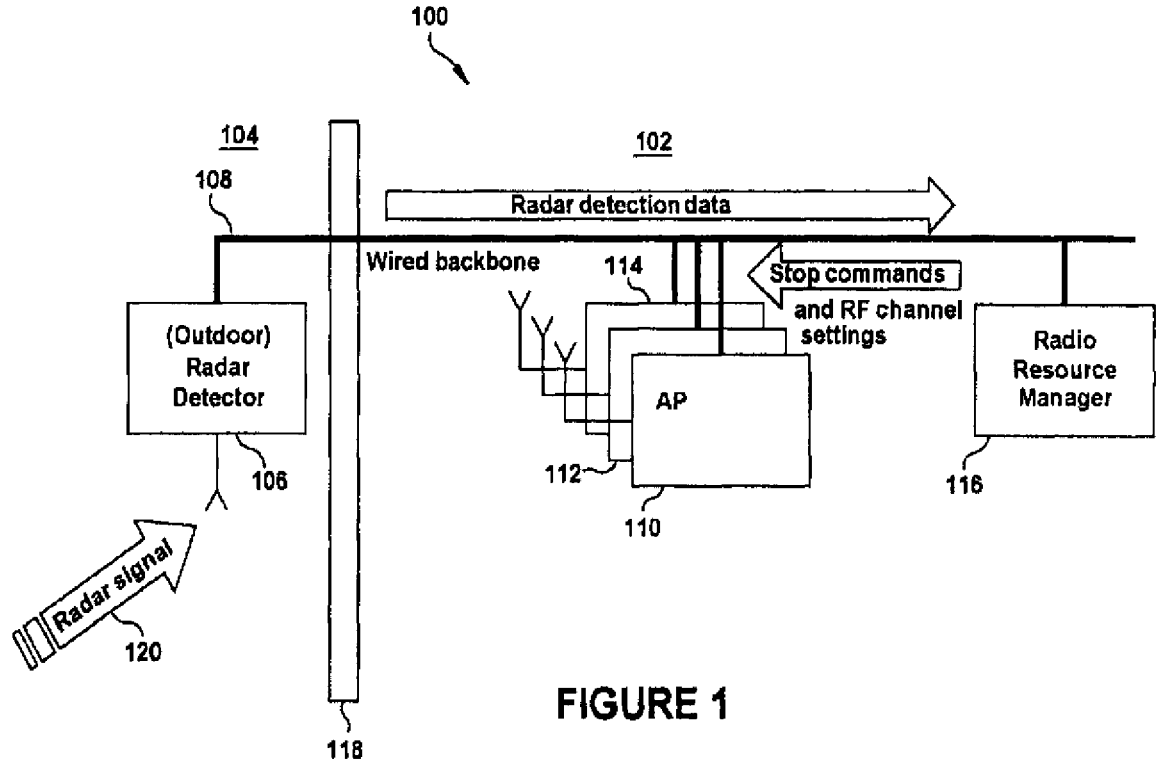

FIGURE 1

Replace Fig. 2 with the following:

Replace Fig. 3 with the following:

Replace Fig. 4 with the following:

CERTIFICATE OF CORRECTION (continued)
U.S. Pat. No. 7,548,750 B2

Replace Fig. 5 with the following:

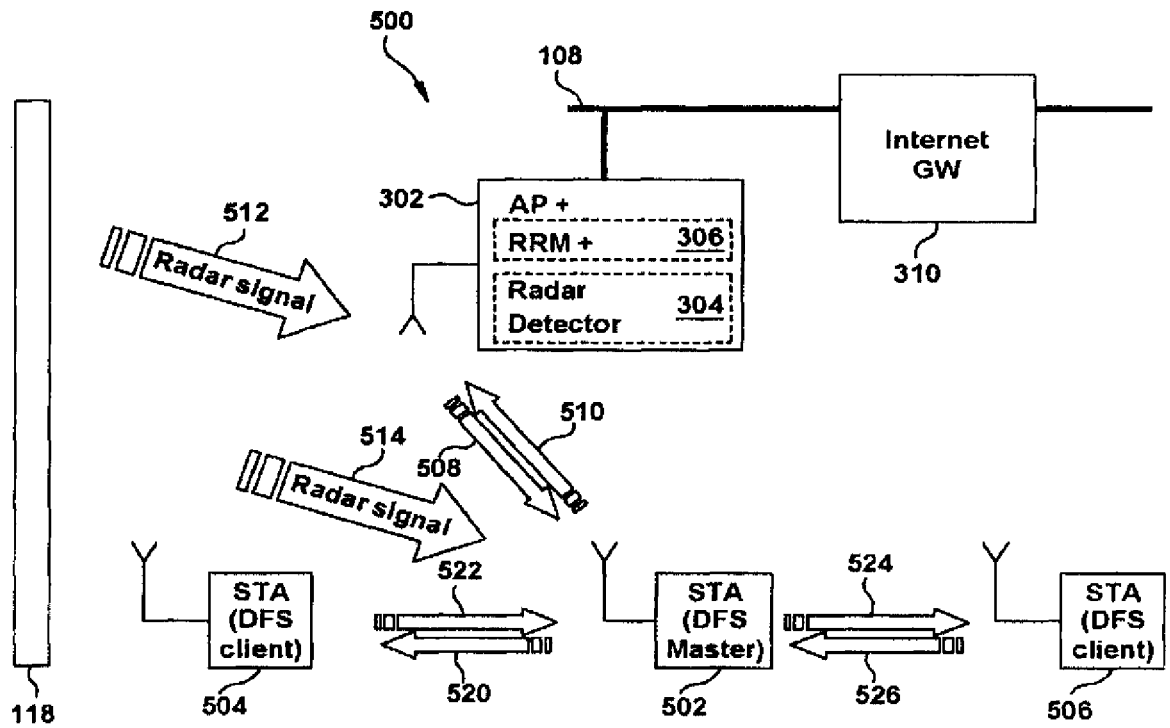

FIGURE 5

Signed and Sealed this

Twenty-sixth Day of January, 2010

David J. Kappos
*Director of the United States Patent and Trademark Office*

(12) United States Patent
Kruys et al.

(10) Patent No.: US 7,548,750 B2
(45) Date of Patent: Jun. 16, 2009

(54) SYSTEM AND METHOD FOR DETECTION OF PRIMARY SPECTRUM USERS

(75) Inventors: Johannes P. Kruys, Harmelen (NL); Christopher G. Mell, Akron, OH (US)

(73) Assignee: Cisco Technology, Inc.

( * ) Notice: Subject to any disclaimer, the term of this patent is extended or adjusted under 35 U.S.C. 154(b) by 576 days.

(21) Appl. No.: 11/225,719

(22) Filed: Sep. 13, 2005

(65) Prior Publication Data
US 2007/0060065 A1 Mar. 15, 2007

(51) Int. Cl.
H04W 24/00 (2006.01)
(52) U.S. Cl. .................. 455/423; 342/159; 342/57; 342/192; 342/195
(58) Field of Classification Search .......... 342/159, 342/57, 192, 195; 455/423
See application file for complete search history.

(56) References Cited

U.S. PATENT DOCUMENTS

| 7,107,032 | B2* | 9/2006 | Li | 455/296 |
| 2003/0107512 | A1* | 6/2003 | McFarland et al. | 342/159 |
| 2003/0206130 | A1* | 11/2003 | Husted et al. | 342/57 |
| 2004/0132411 | A1 | 7/2004 | Li | |
| 2004/0151137 | A1* | 8/2004 | McFarland et al. | 370/329 |
| 2004/0156336 | A1* | 8/2004 | McFarland et al. | 370/329 |
| 2004/0157580 | A1* | 8/2004 | Stadelmeier et al. | 455/338 |
| 2005/0059363 | A1* | 3/2005 | Hansen | 455/127.4 |
| 2005/0059364 | A1* | 3/2005 | Hansen et al. | 455/127.4 |

FOREIGN PATENT DOCUMENTS

WO    WO 02/082844 A2    10/2002

* cited by examiner

Primary Examiner—Matthew D Anderson
Assistant Examiner—April S Guzman
(74) Attorney, Agent, or Firm—Tucker Ellis & West LLP

(57) ABSTRACT

An external primary spectrum user detector (ESUD) is used to take over the role of integral radar detectors, and relieve user devices of the constraints associated with Primary Spectrum User detection. The ESUD can establish a relationship with the user devices by means of a cryptographic signature. The ESUD installation includes assigning it a frequency band to scan for primary spectrum user signals and the type of signals to be detected. Once activated, the ESUD will scan its assigned frequencies and emit to types of messages, "All Clear" and "Primary Spectrum User detected." User devices on the network listen for the ESUD messages. In the absence of messages from the ESUD, the user devices activate their internal primary spectrum user detectors until ESUD messages are received.

10 Claims, 9 Drawing Sheets